Dec. 19, 1939.　　　E. H. PIRON　　　2,184,102
RAIL TRUCK SUSPENSION
Filed July 22, 1937　　　4 Sheets-Sheet 1
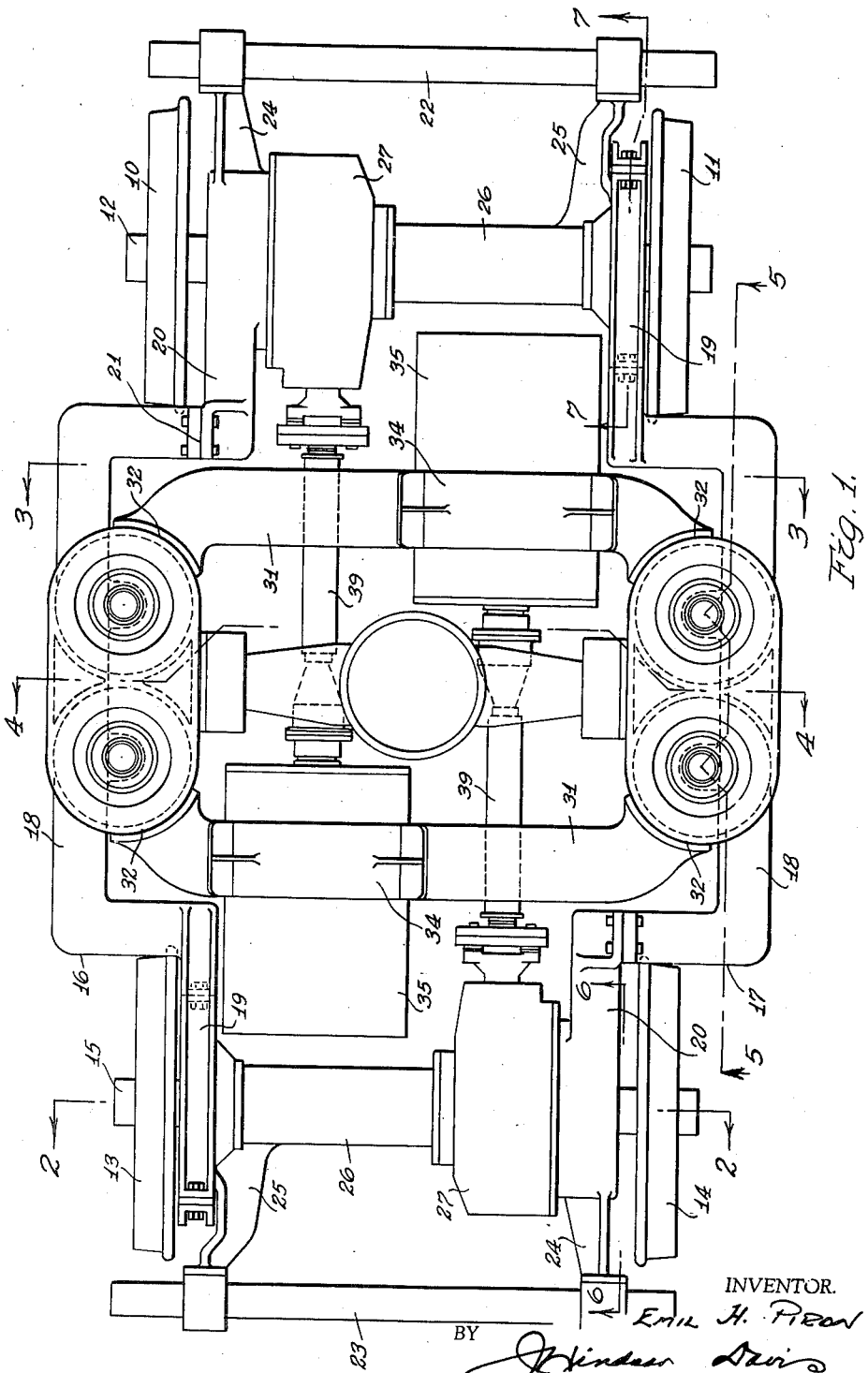
INVENTOR.
EMIL H. PIRON
BY
ATTORNEY.

Dec. 19, 1939.  E. H. PIRON  2,184,102
RAIL TRUCK SUSPENSION
Filed July 22, 1937  4 Sheets-Sheet 2
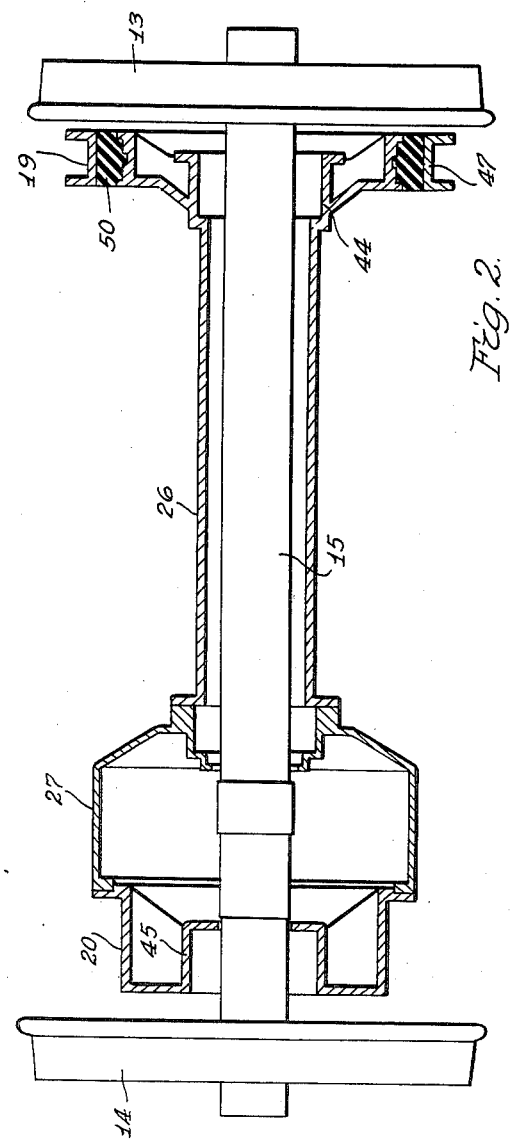
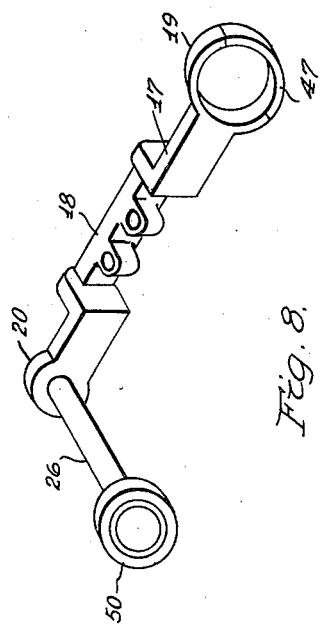
INVENTOR.
EMIL H. PIRON
BY Windsor Davis
ATTORNEY.

Dec. 19, 1939.　　　　E. H. PIRON　　　　2,184,102
RAIL TRUCK SUSPENSION
Filed July 22, 1937　　　　4 Sheets-Sheet 3
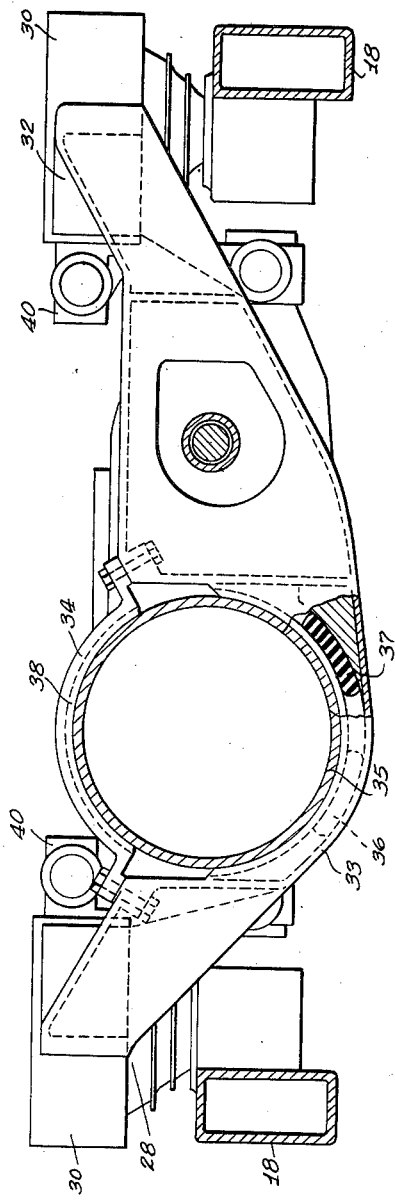
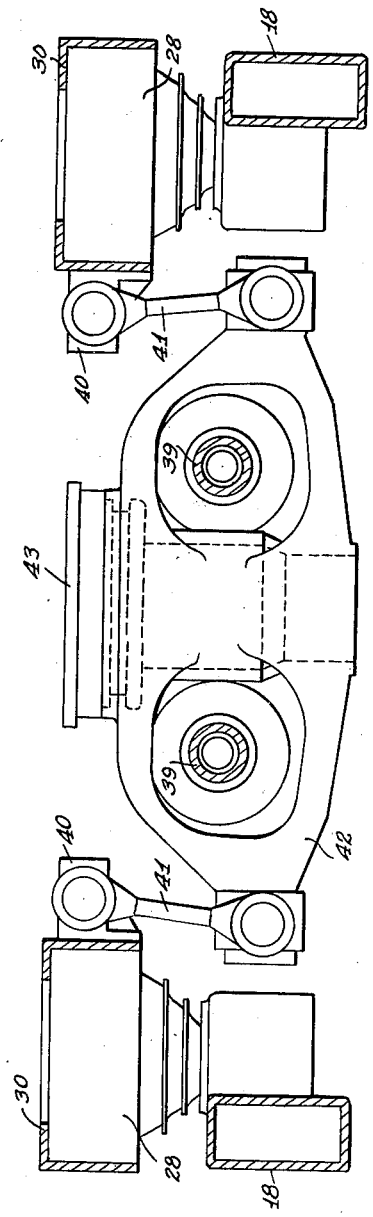
INVENTOR.
EMIL H. PIRON
BY
ATTORNEY.

Dec. 19, 1939.  E. H. PIRON  2,184,102
RAIL TRUCK SUSPENSION
Filed July 22, 1937  4 Sheets-Sheet 4
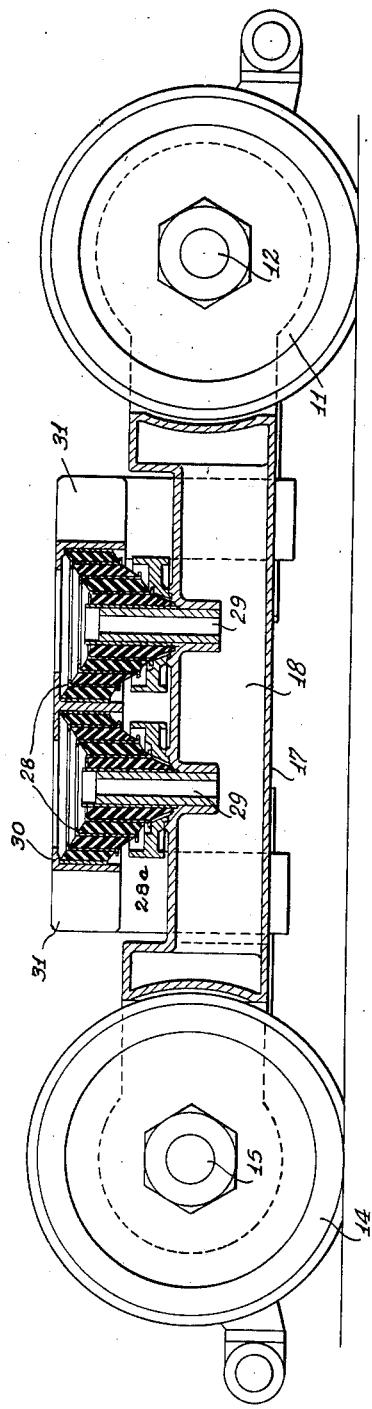
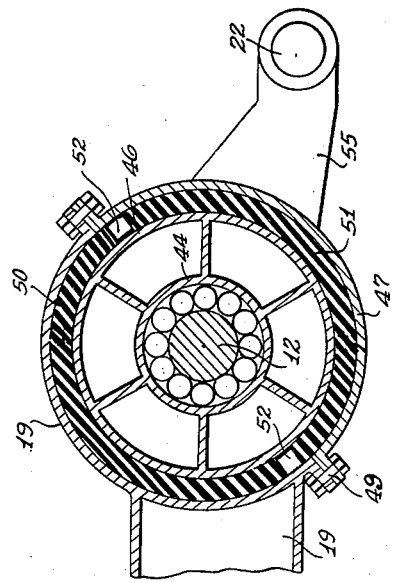
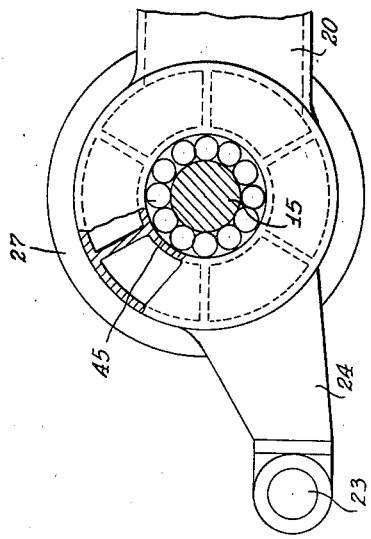
INVENTOR.
Emil H. Piron
BY
J. Hindsor Davis
ATTORNEY.

Patented Dec. 19, 1939

2,184,102

UNITED STATES PATENT OFFICE 2,184,102

RAIL TRUCK SUSPENSION

Emil H. Piron, New York, N. Y., assignor to Transit Research Corporation, New York, N. Y., a corporation of New York Application July 22, 1937, Serial No. 155,083

13 Claims. (Cl. 105—182)

This invention has for one of its objects to eliminate many of the objectionable features of springing systems as used heretofore in rail trucks and similar structures, and more especially trucks involving a main frame and a sub-frame wherein the springing system has resulted in primary or secondary vibration or impulses, or both primary and secondary vibrations or impulses, of an undesirable frequency transmitted to the vehicle body.

In my earlier application, Serial No. 24,190, filed May 31, 1935, I have described a truck construction with a somewhat similar purpose in view wherein the side rails of the main frame are articulated intermediate their ends and so related to the axle housings and journal springs that what may be termed a warping effect is produced in the frame by impulses such as result from the truck passing over rail inequalities, the construction therein disclosed preventing or tending to prevent or minimize the building up of high frequency vibrations or oscillations in the spring system.

The present invention involves some of the principal characteristics of the prior construction referred to, with certain advantages or characteristics peculiar to the present arrangement which will be later referred to.

A further object of the invention is to provide a frame construction which in narrow gage applications will admit of the disposition of bolster springs at a maximum distance each side of the longitudinal center line of the truck with the use of softer springs than would be otherwise required, and the obtaining of a desirably low frequency of rolling tendency of the load carried thereby; the invention contemplating the provision of side frame members in the truck each characterized by outwardly extending intermediate portions, which may be U-shaped in configuration, to carry the bolster springs and forwardly and rearwardly projecting end portions of the said frame extending within the gage of the wheels of the truck.

Still further the said invention provides for the yieldable articulation of the truck frame at diagonally opposite corners; and more particularly for the utilizing of the axle housings as the main end cross members of the frame, with one of the said housings rigidly secured to one of the side members of the frame and yieldably secured to the other side member, the other housing being rigidly secured to the last mentioned side member of the frame and yieldably secured to the first mentioned side member.

Still further it is an object of the invention to provide in a truck frame, such as that just referred to, cushioning means between the non-rigidly mounted ends of the axle housings and the frame capable of absorbing radial, axial and torsional vibrations or impulses set up in the said axle housings.

A further object of the invention is to provide a frame wherein the bolster springs are widely separated laterally, are more or less confined to the center of the truck intermediate its length, and are supported by side members of the frame so articulated as to give the effect of equalizer bars to the said side members.

For the purpose of producing a high degree of riding quality in the body of a vehicle carried by a truck, the invention proposes to provide a truck wherein the driving motors have elastic support in the secondary or upper frame, the secondary frame is assured low frequency oscillation by being sprung from the main frame at points separated laterally from the frame to an abnormal extent, and the main frame is yieldably articulated at diagonally opposite connections of the side members with the axle housings.

Still further objects related or subsidiary to the aforesaid objects, or resulting from the construction or operation of the invention as it may be carried into effect, will become apparent as the said invention is hereinafter further disclosed having reference, by way of example, to the embodiment thereof illustrated in the accompanying drawings, wherein:

Figure 1 is a plan of a rail truck embodying the features of the said invention;

Figure 2 is a sectional plan of the same taken on a horizontal plane through the truck axles;

Figure 3 is a detail transverse cross section taken through the frame on a plane indicated by the line 3—3, Figure 1, showing one of the motor supports and its connections;

Figure 4 is a transverse section through the frame taken on a plane indicated by the line 4—4, Figure 1, showing the swing bolster and its connections;

Figure 5 is a longitudinal vertical section taken on a plane indicated by the line 5—5, Figure 1;

Figure 6 is a fragmentary detail elevation of the non-resiliently articulated end portion of one of the side members of the main frame, partly broken away to show internal structure in section;

Figure 7 is a similar view of the opposite end portion of the same side member as shown in Fig. 6; and Figure 8 is a perspective diagram of one of two units of which the main frame is composed.

Similar characters of reference indicate similar parts in the several figures of the drawings. Figures 3, 4, 6, and 7 are drawn to a larger scale than are Figures 1, 2 and 5.

10 and 11 indicate what will be regarded, for the purposes of this description, as the front wheels of the truck mounted on the axle 12; 13 and 14 as the rear wheels mounted on the axle 15. The main frame includes left and right side members generally numbered 16 and 17. In the case of narrow gage construction these members are characterized by their intermediate portions 18 being of U-shaped configuration in plan whereby their overall transverse dimension is materially greater than the gage of the truck wheels, the legs of the said U-shaped portions extending inwardly of the truck and between the front and rear wheels thereof to points materially within the gage of the wheels.

From the rear leg of the U-shaped portion 18 of the left hand frame member 16 an integral member 19 forming part of the said side frame extends rearwardly behind the wheel 13 and beyond the axle thereof, as does the similar member 19 forming part of the right hand frame member extend forwardly beyond the axle 12 of the right front wheel 11. 20 is a forwardly extending member of the left side frame member 16 bolted to the front leg of the U-shaped portion thereof at 21 and extending behind the left front wheel 10, as does the similar member 20 extend from the rear leg of the U-shaped portion of the right frame member 17 extend behind the right rear wheel 14. The legs of the U are shortened as necessary to fit the construction to different truck gages. The axles 12 and 15 are each mounted in a bearing 44 located at one end in the member 19 and a bearing 45 at the other end in the member 20 as will be hereinafter further described.

Each of the said frame members may be said to extend between the truck wheels and to be outwardly offset intermediate of the front and rear wheels to an extent materially beyond the gage of the said wheels in the narrow gage construction indicated. 22 and 23 are transverse members each connected at one end by a bracket 24 to the member 20 of the said frame and at the other end by a bracket 25 to the axle housing 26 and adapted to support brake mechanism. Each of these axle housings is rigidly secured through the medium of the transmission casing 27 to the member 20 of the said frame but the opposite ends of the said axle housings are not so secured to the members 19 of the side frame, being free thereof except for a yielding connection which will be hereinafter further described.

Mounted on the outwardly extended portions 18 of each side frame member are pairs of closely coupled springs 28 each comprising alternate concentric cylindrical layers of rubber and metal together with a stepped stop plate 28a which progressively eliminates a portion of the spring from acting, as increased deflection is encountered thus giving a changing spring rate or load deflection ratio as described in my Patent No. 2,069,270, issued February 2, 1937, the said springs being positioned on vertical pins 29 and each pair capped by a housing 30. 31 are cross members secured at their ends 32 to the spring housings 30 the said members 31 and spring housing 30 forming a secondary frame or upper frame extending laterally beyond the truck wheels.

Each of the said members 31 includes a cradle 33 and a saddle 34 between which a motor 35 is clamped with the resilient or elastic assistance of interposed rubber or similar pads 36, 37 and 38 as described in my co-pending application Serial No. 148,050, filed June 14, 1937. The centers of the springs 28 are, by virtue of their being mounted on the offset portions of the side frames, situated materially outside of the gage of the truck wheels so that the transverse span of the spring support of the said frame is materially greater than the gage of the wheels in the particular design illustrated, a feature which will be further referred to. 39 indicates the propeller shaft of each motor, the couplings thereof being self-explanatory.

Suspended from projecting lugs 40 extending inwardly of the truck from the opposed faces of the spring housings 30 are swing links 41 supporting the ends of a swing bolster 42 which is adapted to centrally receive the center pin 43 of the car body and such other body supporting means as may be deemed desirable at this point.

As previously stated the bearings 45 are radially fixed in the end members 20 of the side frames. The bearings 44 on the opposite ends of each axle are, however, each mounted in a drum 46 which is in turn housed within a materially larger drum or housing 47 on the end of the frame member 19, these housings being preferably split as at 48 into two parts and held together by bolts 49 whereby they may be separated for access to the interior thereof which accommodates semi-circular rubber or similar resilient or elastic cushions 50 and 51, the opposed ends of which are spaced at 52.

The said cushions 50 and 51 are maintained in a state of compression in the annular space between the drums 46 and 47, as shown in Fig. 7, the spacing 52 of the rubber permitting the endwise spread thereof under such compression and also permitting effective flow or distortion of the rubber under compression or under shear as required to resist movements of the axle housing in any direction including the tendency toward relative rotation of the drums 46 and 47 with respect to each other.

By altering the amount of the spacing 52 and by shifting the two semi-circular elastic cushions 50 and 51 around their center so as to bring the spacings 52 on diameters varying in position between vertical and horizontal it is possible to obtain with a given grade of elastic material such relations between the load deflection ratio in the vertical direction and the load deflection in a fore and aft direction as to obtain that combination adapted to give the best tracking and riding characteristics.

The provision of the said rubber cushions at the frame corners (in this case the right front and left rear corners of the frame) permits the side members of the frame to operate as torque arms about the centers of the left front and right rear bearings 45, and the effect is produced of a frame elastically articulated at two diagonally opposite corners, exemplified by the drums 47, the ends of the axle housings remote from the transmission casings being secured to the drums 46 as distinguished from their being rigidly attached to the frame as has heretofore been usual. In other words the rubber or yieldable mounting of what may be termed the free ends of the axle housings in the frame, and the attachment of the fixed ends of such axle housings in the frame, gives the side members of the said frame the effect of equalizer bars in their ability to partially absorb and distribute road vibration and impulses as well as undesired torque reactions set up in the axle housings. As a consequence of the interposing of the rubber in the frame structure as described torque vibrations are taken by the axle housings.

The main frame is composed of two characteristic units, one of which is illustrated in Figure 8 as comprising the side frame member or torque arm 17 from one end of which extends the cross frame member in the form of the axle housing 26 the free end of which is embraced by the rubber or similar annulus 50, 51. It will be observed that, by holding the said annulus, the arm 17 may be swung vertically about the axis of the housing 26 against the torsional resistance of the said annulus. To complete the frame, a similar unit in reversed position is simply assembled to the unit shown, the torque arms being adapted at 47 to receive the rubber embraced free ends of the housings to form the holding means therefor. Thus the said annuli, in addition to the torsional resistance referred to, offer radial resistance to the movement of the ends of the arms in which they are entered relative to the entered end of the housing.

The intermediate broadening of the main frame in the manner described, permitting the spacing of the springs to a considerably greater degree than is ordinarily permitted by the usual type of straight frame and to an extent where the spring centers are materially outside of the gage of the wheel in the design illustrated results in a comparatively wide secondary frame in which rolling tendency is markedly reduced in frequency and the use of relatively soft springs is rendered possible.

It will be readily seen that the springing system disclosed admits of the securing of greatly enhanced riding qualities in a vehicle to which such a truck may be applied, as undesired vibrations and impulses are not only limited or minimized by the vibration absorbing qualities of the rubber in the diagonally opposite frame corners, the torque resisting functions thereof, the equalizer bar effect of the frame side members, the low frequency oscillation obtained in the bolster springs, and the motor vibriation absorbed by the elastic support of the motors in their cradles, but also by the modifying influence of these features in combination one upon the other.

This invention may be developed within the scope of the following claims without departing from the essential features of said invention and it is desired that the specification and drawings be read as being merely illustrative of one form of the invention and not in a limiting sense, except as necessitated by the prior art.

What I claim is:

1. In a truck, a frame unit comprising a cross frame member, a torque arm rigidly connected to and extending from one end of said member and constituting a side frame member, and an elastic torsion resisting element embracing and constituting an elastic mounting for the other end of said cross member.

2. In a truck, a frame unit comprising an axle housing constituting a cross frame member, a torque arm rigidly connected to and extending from one end of said housing and constituting a side frame member, and a second torque arm elastically connected to and extending from the other end of said housing and also constituting a side frame member.

3. In a truck, a frame unit comprising an axle housing constituting a cross frame member, a torque arm rigidly connected to and extending from one end of said housing and constituting a side frame member, and an elastic torsion resisting element embracing and constituting an elastic mounting for the other end of said cross member.

4. In a truck, a side frame member adapted for fixed connection at one end to an axle housing, and a radially and torsionally elastic mounting in the other end of said member to receive an axle housing.

5. A truck frame comprising, in combination, a pair of units, each unit comprising a cross frame member, a torque arm rigidly connected to and extending from one end of said member and constituting a side frame member, and elastic torsion resisting means engaging the other end of said cross member, the torsion resisting means of one unit being housed in the free end of the torque arm of the other unit.

6. A truck frame comprising, in combination, a pair of units, each unit comprising a cross frame member, a torque arm rigidly connected to and extending from one end of said member and constituting a side frame member, and an elastic torsion resisting element embracing the other end of said cross member, the torsion resisting element of one unit being mounted in the free end of the torque arm of the other unit.

7. A truck frame comprising, in combination, a pair of units, each unit comprising an axle housing constituting a cross frame member, a torque arm rigidly connected to and extending from one end of said housing and constituting a side frame member, and an elastic torsion resisting element engaging the other end of said housing, the torsion resisting element of one unit being housed in the free end of the torque arm of the other unit.

8. A truck frame comprising, in combination, a pair of units, each unit comprising an axle housing constituting a cross frame member, a torque arm rigidly connected to and extending from one end of said housing and constituting a side frame member, and an elastic torsion resisting element embracing and constituting an elastic mounting for the other end of said housing, the torsion resisting element of one unit being mounted in the free end of the torque arm of the other unit.

9. In a truck, in combination, front and rear axles, wheels on said axles, housings journalled on said axles, a torque arm extending within the gage of said wheels from the rear housing to the front housing on one side of said truck, a second torque arm similarly extending from the front housing to the rear housing on the other side of said truck, an elastic torsion element embracing the front housing and engaged by the first arm, an elastic torsion element embracing the rear housing and engaged by the second arm, bolster springs, and means intermediate the length of said arms supporting said springs exterior to the gage of said wheels.

10. In a truck, in combination, front and rear axles, wheels on said axles, a frame including side members extending within the gage of said wheels, means providing elasticity at diagonally opposite corners of said frame at said axles, bolster springs, means intermediate the length of said side members supporting said springs exterior to the gage of said wheels, an upper frame supported by said bolster springs, and motors coupled to said axles and resiliently mounted in said upper frame.

11. In a rail truck, wheels having axles, equalizer bars connecting said axles, one end of each of said equalizer bars being journalled directly on its axle, the other end of each of said equalizer bars being connected to a journal bearing through elastic material, said elastic material being in the form of ring segments with the ends of each of said segments being circumferentially spaced from those of the adjacent segment.

12. In a rail truck, wheels having axles, equalizer bars connecting said axles, one end of each of said equalizer bars being journalled directly on its axle, the other end of each of said equalizer bars being connected to a journal bearing through elastic material, said elastic material being in the form of ring segments with the ends of each of said segments being circumferentially spaced from those of the adjacent segment, the spacing between the ends of said segments being diametrically opposite and on a diameter out of the vertical.

13. In a rail truck, the combination of axles, side frames supported from said axles, an elastic connection between one end of each of said frames and its axle, a swing bolster, elastic shear springs supporting said swing bolster from said side frames, and means increasing the load deflection ratio of said springs under increasing loading thereon by said bolster.

EMIL H. PIRON.